US012066714B2

(12) United States Patent
Liu et al.

(10) Patent No.: US 12,066,714 B2
(45) Date of Patent: Aug. 20, 2024

(54) DISPLAY PANEL AND DISPLAY DEVICE

(71) Applicant: WUHAN CHINA STAR OPTOELECTRONICS TECHNOLOGY CO., LTD., Wuhan (CN)

(72) Inventors: Fancheng Liu, Wuhan (CN); Guowei Zha, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/760,784

(22) PCT Filed: Feb. 10, 2022

(86) PCT No.: PCT/CN2022/075885
§ 371 (c)(1),
(2) Date: Mar. 16, 2022

(87) PCT Pub. No.: WO2023/142165
PCT Pub. Date: Aug. 3, 2023

(65) Prior Publication Data
US 2024/0053635 A1 Feb. 15, 2024

(30) Foreign Application Priority Data

Jan. 27, 2022 (CN) .......................... 202210100706.X

(51) Int. Cl.
G02F 1/13357 (2006.01)
G02F 1/1335 (2006.01)
(52) U.S. Cl.
CPC .. *G02F 1/133606* (2013.01); *G02F 1/133604* (2013.01); *G02F 1/133605* (2013.01);
(Continued)

(58) Field of Classification Search
CPC ......... G02F 1/133606; G02F 1/133604; G02F 1/133605; G02F 1/133614;
(Continued)

(56) References Cited

U.S. PATENT DOCUMENTS

2008/0062715 A1 3/2008 Park et al.
2014/0176859 A1 6/2014 Lin et al.
(Continued)

FOREIGN PATENT DOCUMENTS

CN 101989006 A 3/2011
CN 102109101 A 6/2011
(Continued)

OTHER PUBLICATIONS

PCT International Search Report for International Application No. PCT/CN2022/075885, mailed on Oct. 8, 2022, 10pp.
(Continued)

*Primary Examiner* — Anne M Hines
*Assistant Examiner* — Jose M Diaz
(74) *Attorney, Agent, or Firm* — The Roy Gross Law Firm, LLC; Roy Gross

(57) ABSTRACT

A display panel and a display device are provided in the present disclosure. The display panel includes a backlight assembly, a panel body, and a light converging adhesive layer. The panel body is disposed on a light emitting side of the backlight assembly, the light converging adhesive layer is disposed between the panel body and the backlight assembly, and the backlight assembly is attached to the panel body through the light converging adhesive layer, wherein the light converging adhesive layer includes a plurality of light converging structures to converge the light emitted by the backlight assembly.

19 Claims, 3 Drawing Sheets

(52) U.S. Cl.
CPC .. *G02F 1/133614* (2021.01); *G02F 1/133603* (2013.01); *G02F 2202/28* (2013.01)

(58) Field of Classification Search
CPC ........... G02F 1/133603; G02F 2202/28; G02F 1/133616; G02F 1/133602; G02B 6/0036
See application file for complete search history.

(56) References Cited

U.S. PATENT DOCUMENTS

| | | | |
|---|---|---|---|
| 2016/0223734 A1* | 8/2016 | Hsu | G02B 6/0018 |
| 2023/0050100 A1* | 2/2023 | Lai | G02F 1/133603 |

FOREIGN PATENT DOCUMENTS

| | | |
|---|---|---|
| CN | 105629528 A | 6/2016 |
| CN | 206773349 U | 12/2017 |
| CN | 208027042 U | 10/2018 |
| CN | 109946874 A | 6/2019 |
| CN | 209216444 U | 8/2019 |
| CN | 210072264 U | 2/2020 |
| CN | 210244014 U | 4/2020 |
| CN | 111095088 A | 5/2020 |
| CN | 111834544 A | 10/2020 |
| CN | 112764152 A | 5/2021 |
| CN | 112902111 A | 6/2021 |
| CN | 113050326 A | 6/2021 |
| CN | 113589591 A | 11/2021 |
| CN | 113820888 A | 12/2021 |
| JP | H10213798 A | 8/1998 |
| JP | 2006084757 A | 3/2006 |
| JP | 2007025109 A | 2/2007 |
| TW | 575765 B | 2/2004 |
| TW | M613917 U | 7/2021 |

OTHER PUBLICATIONS

PCT Written Opinion of the International Searching Authority for International application No. PCT/CN2022/075885, mailed on Oct. 8, 2022, 8pp.

Chinese Office Action issued in corresponding Chinese Patent Application No. 202210100706.X dated Oct. 20, 2022, pp. 1-8, 18pp.

Chinese Office Action issued in corresponding Chinese Patent Application No. 202210100706.X dated Mar. 29, 2023, pp. 1-8, 17pp.

* cited by examiner

DISPLAY PANEL AND DISPLAY DEVICE

CROSS REFERENCE TO RELATED APPLICATIONS

This application is a National Phase of PCT Patent Application No. PCT/CN2022/075885 having International filing date of Feb. 10, 2022, which claims the benefit of priority of Chinese Application No. 202210100706.X filed on Jan. 27, 2022. The contents of the above applications are all incorporated by reference as if fully set forth herein in their entirety.

FIELD OF INVENTION

The present disclosure relates to the field of display technologies, and more particularly, to a display panel and a display device including the display panel.

BACKGROUND OF INVENTION

With the development of display technology, flat display devices such as liquid crystal display (LCD) are widely used in mobile phones, televisions, personal digital assistants, digital cameras, notebook computers, desktop computers, and other consumer electronic products because of their high image quality, power saving, thin body and wide application range.

Most of the liquid crystal display devices in the existing market are backlight type liquid crystal displays, including a liquid crystal panel body and a backlight module. Generally, the liquid crystal panel body is composed of a color filter (CF) substrate, a thin film transistor (TFT) substrate, a liquid crystal layer located between the color filter substrate and the thin film transistor substrate, and a sealant frame. In the existing display panel, the LCD panel body needs to be equipped with a backlight module. In the field of photoelectric, light emitting diode (LED) is a semiconductor diode that can convert electric energy into light, including gallium arsenide LED (red light), gallium phosphide LED (green light), gallium nitride LED (blue light), etc. LED can be used in the backlight module. Mini-LED refers to LED chips with a size of 50-200 microns. The types of Mini-LED backlight can be divided into white light Mini-LED lamp boards and blue light Mini-LED lamp board.

However, in the related art, the panel body and the backlight module are two independent components, and then they are assembled through a structure such as a middle frame or a rubber frame, which makes the structure of the display panel more complex. It is difficult to realize integration and integration requirements. For example, it is difficult to realize functions such as synchronous bending in the curved display panel. In addition, the multiple optical films are required to improve the light emitting efficacy, which increases the thickness of the display panel. Therefore, it is difficult to meet the lighting and thinning requirement of the display panel.

Technical Problems

Embodiment of the present disclosure provide a display panel and a display device, which realizes the integrate arrangement of the backlight assembly and the panel body, thereby improving the light emitting effect of the backlight module and the display effect of the panel body.

SUMMARY OF INVENTION

Technical Solutions

The embodiment of the present disclosure provides a display panel, including:
 a backlight assembly;
 a panel body disposed on a light emitting side of the backlight assembly;
 a light converging adhesive layer, disposed between the panel body and the backlight assembly, and wherein the backlight assembly is attached to the panel body through the light converging adhesive layer; and
 wherein the light converging adhesive layer includes a plurality of light converging structures to converge the light emitted by the backlight assembly.

In one embodiment of the present disclosure, the light converging adhesive layer includes a first adhesive layer disposed on a side of the backlight assembly adjacent to the panel body, and a second adhesive layer disposed on a side of the first adhesive layer adjacent to the panel body;
 wherein a refractive index of the first adhesive layer is greater than a refractive index of the second adhesive layer, the light converging structures includes a plurality of convex portions disposed in the first adhesive layer, and the second adhesive layer covers the plurality of convex portions.

In one embodiment of the present disclosure, a cross-sectional area of each of the plurality of convex portions decreases along a light emitting direction of the backlight assembly.

In one embodiment of the present disclosure, each of the plurality of convex portions is a multi-faceted tapered structure.

In one embodiment of the present disclosure, the backlight assembly further includes a third adhesive layer attached to the light converging adhesive layer, the material of the third adhesive layer is same as the material of the plurality of convex portions, and the plurality of convex portions is disposed on a side of the third adhesive layer adjacent to the second adhesive layer.

In one embodiment of the present disclosure, the refractive index of the first adhesive layer is greater than or equal to 1.45 and less than or equal to 2, and the refractive index of the second adhesive layer is greater than or equal to 1 and less than or equal to 1.45.

In one embodiment of the present disclosure, the backlight assembly includes a substrate, a plurality of light emitting components disposed on the substrate, and a reflective layer disposed on the substrate and between the adjacent light emitting components, wherein each of the light emitting components includes a lamp element disposed on the substrate, and a color conversion film covering the lamp element.

In one embodiment of the present disclosure, the backlight assembly includes a plurality of light emitting sub-regions, each of the light emitting sub-regions is provided with at least one of the light emitting components, and the backlight assembly further includes a retaining wall disposed on the substrate and arranged around each of the light emitting sub-regions, and a light reflecting surface disposed on a side of the retaining wall adjacent to the light emitting components.

In one embodiment of the present disclosure, the backlight assembly further includes an encapsulation adhesive layer disposed on the substrate, and a light mixing layer disposed on a side of the encapsulation adhesive layer away from the substrate, the encapsulation adhesive layer covers the plurality of light emitting components and the retaining wall, the light mixing layer includes a plurality of light transmitting openings arranged at intervals, and the material of the light mixing layer includes a reflective material.

In one embodiment of the present disclosure, the light mixing layer includes a plurality of first regions and a plurality of second regions, each of the first regions is overlapped with the lamp element, and one of the plurality of second regions is located between the adjacent two first regions, wherein an area proportion of the light transmitting opening in the second region is greater than an area proportion of the light transmitting opening in the first region.

In one embodiment of the present disclosure, the sum of the areas of the light transmitting openings in the plurality of second regions is greater than the sum of the areas of the light transmitting openings in the plurality of first regions.

In one embodiment of the present disclosure, the area of each light transmitting opening in the second region is greater than the area of each light transmitting opening in the first region, and/or a number of light transmitting openings in the second region is greater than a number of light transmitting openings in the first region.

According to the above object of the present disclosure, a display device is provided. The display device including a display panel, and the display panel including:
- a backlight assembly;
- a panel body disposed on a light emitting side of the backlight assembly;
- a light converging adhesive layer, disposed between the panel body and the backlight assembly, and wherein the backlight assembly is attached to the panel body through the light converging adhesive layer; and
- wherein the light converging adhesive layer includes a plurality of light converging structures to converge the light emitted by the backlight assembly.

In one embodiment of the present disclosure, the light converging adhesive layer includes a first adhesive layer disposed on a side of the backlight assembly adjacent to the panel body, and a second adhesive layer disposed on a side of the first adhesive layer adjacent to the panel body;
- wherein a refractive index of the first adhesive layer is greater than a refractive index of the second adhesive layer, the light converging structures includes a plurality of convex portions disposed in the first adhesive layer, and the second adhesive layer covers the plurality of convex portions.

In one embodiment of the present disclosure, a cross-sectional area of each of the plurality of convex portions decreases along a light emitting direction of the backlight assembly.

In one embodiment of the present disclosure, each of the plurality of convex portions is a multi-faceted tapered structure.

In one embodiment of the present disclosure, the backlight assembly includes a substrate, a plurality of light emitting components disposed on the substrate, and a reflective layer disposed on the substrate and between the adjacent light emitting components, wherein each of the light emitting components includes a lamp element disposed on the substrate, and a color conversion film covering the lamp element.

In one embodiment of the present disclosure, the backlight assembly includes a plurality of light emitting sub-regions, each of the light emitting sub-regions is provided with at least one of the light emitting components, and the backlight assembly further includes a retaining wall disposed on the substrate and arranged around each of the light emitting sub-regions, and a light reflecting surface disposed on a side of the retaining wall adjacent to the light emitting components.

In one embodiment of the present disclosure, the backlight assembly further includes an encapsulation adhesive layer disposed on the substrate, and a light mixing layer disposed on a side of the encapsulation adhesive layer away from the substrate, the encapsulation adhesive layer covers the plurality of light emitting components and the retaining wall, the light mixing layer includes a plurality of light transmitting openings arranged at intervals, and the material of the light mixing layer includes a reflective material.

In one embodiment of the present disclosure, the light mixing layer includes a plurality of first regions and a plurality of second regions, each of the first regions is overlapped with the lamp element, and one of the plurality of second regions is located between the adjacent two first regions, wherein an area proportion of the light transmitting opening in the second region is greater than an area proportion of the light transmitting opening in the first region.

Beneficial Effect

Compared with the exist technology, in the present disclosure, the backlight assembly is attached to the panel body through the light converging adhesive layer, so as to improve the degree of the integration of the backlight assembly and the panel body. In addition, the light converging adhesive layer includes a plurality of light converging structures, which can converge the light emitted by the backlight assembly, thereby improving the light converging effect of the backlight assembly. In this way, the number of the optical films disposed between the backlight assembly and the panel body can reduce, thereby effectively reducing the thickness of the display panel and realizing the lightness and thinness of the display panel.

DESCRIPTION OF DRAWINGS

In order to more clearly describe the technical solutions in the embodiments of the present application, the following will briefly introduce the drawings needed in the description of the embodiments. Obviously, the drawings in the following description are only some embodiments of the present application. For those skilled in the art, without creative work, other drawings can be obtained based on these drawings.

DETAILED DESCRIPTION OF PREFERRED EMBODIMENTS

Figure 1:
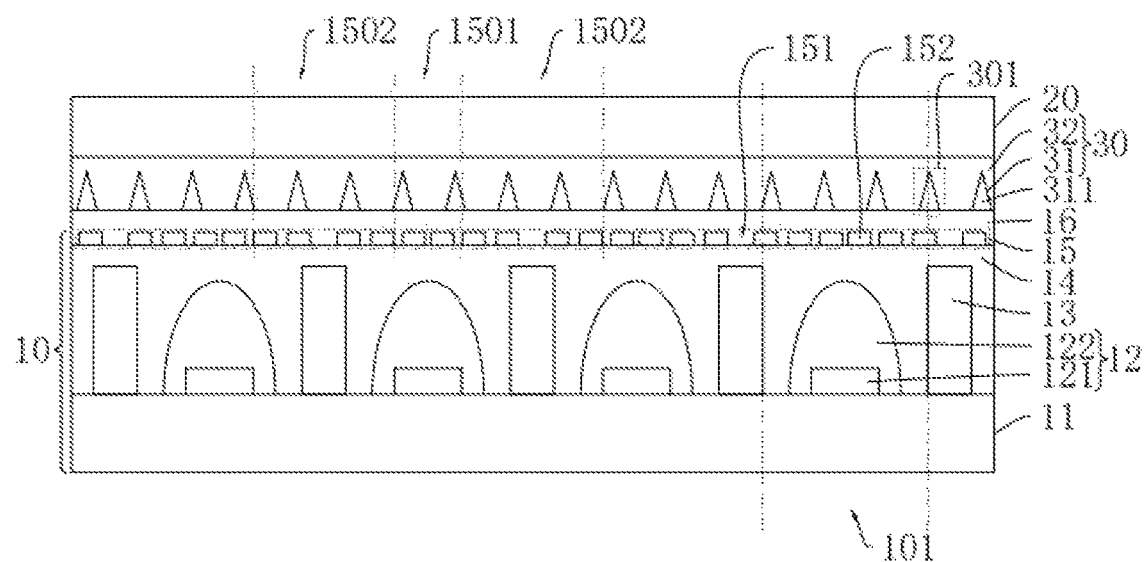
FIG. 1 is a schematic structural diagram of a display panel provided by an embodiment of the present disclosure.

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in this application, all other embodiments obtained by those skilled in the art without creative efforts shall fall within the protection scope of this application.

The following disclosure provides many different embodiments or examples for implementing different structures of the present application. To simplify the disclosure of the present application, the components and arrangements of specific examples are described below. Of course, they are only examples and are not intended to limit the application. Furthermore, this application may repeat reference numerals and/or reference letters in different instances for the purpose of simplicity and clarity, and does not in itself indicate a relationship between the various embodiments and/or arrangements discussed. In addition, this application provides examples of various specific processes and materials, but one of ordinary skill in the art will recognize the application of other processes and/or the use of other materials.

Please refer to FIG. 1, a display panel is provided by the present disclosure. The display panel includes a backlight assembly 10, a panel body 20, and a light converging adhesive layer 30.

The panel body 20 is disposed on a light emitting side of the backlight assembly. The light converging adhesive layer 30 is disposed between the panel body 20 and the backlight assembly 10, and the backlight assembly 10 is attached to the panel body 20 through the light converging adhesive layer 30.

Furthermore, the light converging adhesive layer 30 comprises a plurality of light converging structures 301 to converge the light emitted by the backlight assembly 10.

In the embodiment of the present disclosure, the backlight assembly 10 is attached to the panel body 20 through the light converging adhesive layer 30, so as to improve the degree of the integration of the backlight assembly 10 and the panel body 2. In addition, the light converging adhesive layer 30 includes a plurality of light converging structures 301, which can converge the light emitted by the backlight assembly 10, thereby improving the light converging effect of the backlight assembly 10. In this way, the number of the optical films disposed between the backlight assembly 10 and the panel body 20 can reduce, thereby effectively reducing the thickness of the display panel and realizing the lightness and thinness of the display panel.

Specifically, please refer to FIG. 1, the display panel 10 includes the backlight assembly 10, the panel body 20 disposed on the light emitting side of the backlight assembly 10, and the light converging adhesive layer 30 disposed between the backlight assembly 10 and the panel body 20. The backlight assembly 10 is attached to the panel body 20 through the light converging adhesive layer 30, so as to realizes the integration of the backlight assembly 10 and the panel body 20.

The backside assembly 10 includes a substrate 11, a plurality of light emitting components 12, a retaining wall 13, an encapsulation adhesive layer 14, and a light mixing layer 15.

In the embodiment of the present disclosure, the substrate 11 may be a glass substrate or an organic resin substrate. The plurality of the light emitting components 12 are disposed on the substrate 11, and the light emitting components 12 may emit white light.

Furthermore, the light emitting component 12 includes a lamp element 121 disposed on the substrate 11, and a color conversion film 122 covering the lamp element 121, wherein the lamp element 121 can emit non-white light, and the non-white light passing through the color conversion film can be converted into white light. For example, lamp element 121 can emit blus light. Alternatively, the light emitting component 12 only includes a lamp element 121, and the lamp element 121 can emit white light. In this way, the arrangement of the color conversion film 122 is not required, and one manufacturing process can be emitted. It should be understood that, in the embodiment of the present disclosure, in order to emit the white light, the cooperation between the lamp element 121 emitting other color light and the color conversion film 122 is taken as an example for description.

Optionally, the lamp element 121 may include a blue light LED lamp element, specifically, a blue light Mini-LED lamp element. The material of the color conversion film 122 includes a fluorescence material or a quantum dot material.

It should be noted that the backlight assembly 10 further include a reflective layer (not shown) disposed on the substrate 11, and a plurality of openings are formed in the reflective layer. The lamp element 121 is arranged in the opening. The lamp element 121 protrudes out of the opening. The color conversion film 122 is formed to cover the lamp element 121. In this way, the reflective layer is located between the adjacent two light emitting components 12, such that when the light emitted by the light emitting component 12 is reflected to the substrate 11, the above light can be reflected to the light emitting side of the backlight assembly 10.

Optionally, the material of the reflective layer includes a white ink or a metal material.

Furthermore, in the embodiment of the present disclosure, the backlight assembly 10 includes a plurality of light emitting sub-regions 101, each of the light emitting sub-regions 101 is provided with at least one of the light emitting components 12. In this embodiment, for description, each of the light emitting sub-regions 101 is provided with one light emitting components 12.

The retaining wall 13 is disposed on the substrate 11 and arranged around each of the light emitting sub-regions 101. The height of the retaining wall 13 is greater than the height of the light emitting component 12. Furthermore, a light reflecting surface disposed on a side of the retaining wall 13 adjacent to the light emitting component 12, so as to reflect the light emitted by the light emitting component 12 adjacent to the retaining wall 13. On the one hand, when each of the light emitting sub-regions 101 singly emit light, it can prevent the adjacent light emitting sub-region 101 from being affected. On the other hand, the light emitted by the light emitting component 12 can be reflected by the retaining wall 13 to adjust the light path, such that the above light propagates toward the emitting side of the backlight assembly 10.

Optionally, the material of the retaining wall includes a high reflective adhesive material, which may specifically include silica gel and titanium oxide.

The encapsulation adhesive layer 14 is disposed on the substrate 11, and the encapsulation adhesive layer 14 covers the plurality of light emitting components 12 and the retaining wall 13, to protect the plurality of light emitting components 12. In addition, in the embodiment of the present disclosure, the backlight assembly 10 is defined by zoning by arranging the retaining wall 13. Therefore, the flow range of the glue of the encapsulation adhesive layer 14 is relatively less in the manufacturing process, which can effectively improve the leveling performance of the glue. In this way, the flatness of the encapsulation adhesive layer 14 can be improved, thereby improving the effect and the uniformity of the light emitted by the backlight assembly 10.

Optionally, the material of the encapsulation adhesive layer 14 may be a transparent glue material, and specifically, may include a silica gel or the like. The refractive index of the encapsulation adhesive layer 14 may be greater than or equal to 1.4 and less than or equal to 1.6.

The light mixing layer 15 is disposed on a side of the encapsulation adhesive layer 14 away from the substrate 11. The light mixing layer 15 includes a plurality of light transmitting openings 151 and a plurality of reflective portions 152 located between the adjacent light transmitting openings 151. The reflective portions 152 can reflect the light emitted by the light emitting component 12. Furthermore, the light mixing layer 15 includes a plurality of first regions 1501 and a plurality of second regions 1502, each of the first regions 1501 is overlapped with the lamp element 121, and one of the plurality of second regions 1502 is located between the adjacent first regions 1501, wherein an area proportion of the light transmitting opening in the second region 1502 is greater than an area proportion of the light transmitting opening in the first region 1501.

In addition, the light emitted by the lamp element 121 is converted into white light by the color conversion film 122, and the white light is emitted at a certain angle. The oblique light emitted by the lamp element 121 propagates to the retaining wall 13, and then, the oblique light is reflected to the light mixing layer 15 by the retaining wall 13. The forward light directly propagates to the light mixing layer 13. More specifically, when the white light propagates toward the light mixing layer 15, the white light propagating to the light transmitting openings 151 can directly pass through the light mixing layer 15. The white light propagating to the reflective portion 152 can be reflected to the substrate 11, and then be reflected to the light mixing layer 15 by the reflective layer. It should be understood that the light is reflected between the reflective layer and the light mixing layer 15, and the light exists from the transmitting opening 151 of the light mixing layer 15. The intensity of the forward light emitted by the lamp element 121 is greater than the intensity of the oblique light emitted by the lamp element 121, therefore, in the related art, the light emitted by the lamp panel is ununiform because the intensity of the forward light emitted by LED is greater than the intensity of the oblique light emitted by the LED. However, in the embodiment of the present disclosure, the area proportion of the light transmitting opening in the second region 1502 is greater than the area proportion of the light transmitting opening in the first region 1501, which can enhance the intensity of the light emitted through the second region 1502. That means that the embodiment of the present disclosure improves the uniformity of the light emitted through the first region 1501 and the second region 1502 by arranging the light mixing layer 15.

Specifically, the sum of the areas of the light transmitting openings in the second regions 1502 is greater than the sum of the areas of the light transmitting openings in the first regions 1501. Furthermore, it may be that a number of light transmitting openings in the second region 1502 is greater than a number of light transmitting openings in the first region 1501, and/or the area of each light transmitting opening in the second region 1502 is greater than the area of each light transmitting opening in the first region 1501. In addition, the area proportion of the light transmitting opening in the first region 1501 is increasing along a direction toward to the second region 1502, and the area proportion of the light transmitting opening in the second region 1502 is increasing along a direction away from the first region 1501.

Optionally, the material of the reflective portion 152 includes reflective materials, specifically, includes a combination of silica gel and titanium oxide, or a reflective metal material, which is not limited herein and can be selected according to actual needs.

In addition, the backlight assembly further includes a third adhesive layer 16 disposed on the encapsulation adhesive layer 14, wherein the third adhesive layer 16 covers the light mixing layer 15.

The light converging adhesive layer 30 is disposed on the third adhesive layer 16, and the light converging adhesive layer 30 includes the plurality of light converging structures 301 to converge the light emitted by the backlight assembly 10, thereby improving the effect and the efficiency of the light emitted by the backlight assembly 10.

Preferably, the plurality of light converging structures 301 may uniformly be arranged in the light converging adhesive layer 30, so as to effectively improve the uniformity and the intensity of the light emitted by the backlight assembly 10.

It should be understood that the plurality of light converging structures 301 may be arranged in a one-to-one correspondence with the plurality of light emitting components 12, or one light converging structures 301 may be arranged corresponding to multiple light emitting components 12, or one light emitting component 12 may be arranged corresponding to multiple light converging structures 301. Furthermore, the distribution density of the light converging structures 301 in the region of the backlight assembly 10, where has a weaker light intensity, may be higher than the distribution density in the region of the backlight assembly 10, where has a stronger light intensity. For example, the distribution density of the light converging structures 301 in the second region 1502 may be greater than the distribution density of the light converging structures 301 in the first region 1501.

Specifically, the light converging adhesive layer 30 includes a first adhesive layer 31 disposed on the third adhesive layer 16 and a second adhesive layer 32 disposed a side of the first adhesive layer away from the third adhesive layer 16. The first adhesive later 31 includes a plurality of convex portions 311 disposed on a side of the third adhesive layer 16 adjacent to the second adhesive layer 32, the second adhesive layer 32 covers the plurality of convex portions 311, and the light converging structures 301 includes the plurality of the plurality of convex portions 311. Furthermore, a refractive index of the first adhesive layer 131 is greater than a refractive index of the second adhesive layer 132, that is, the first adhesive layer 131 is a high refractive index adhesive layer and the second adhesive layer 132 is a low refractive index adhesive layer. In this way, a difference of refractive index is formed at the interface between the first adhesive layer 131 and the second adhesive layer 132, so as to converge the light passing through thereof.

Figure 2:
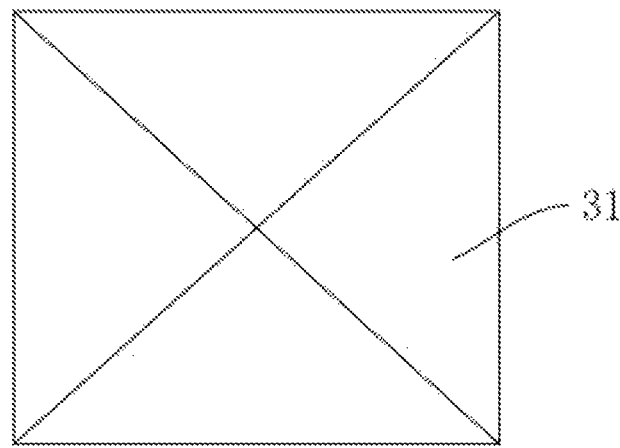
FIG. 2 is a top view of the structure of a convex portion in a first adhesive layer provided by the embodiment of the present disclosure.
Figure 3:
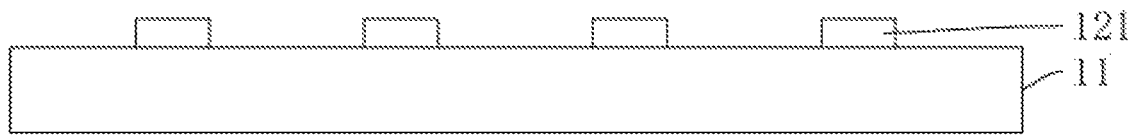
FIG. 3 is a schematic structural diagram in one manufacturing process of the display panel provided by the embodiment of the present disclosure.
Figure 4:
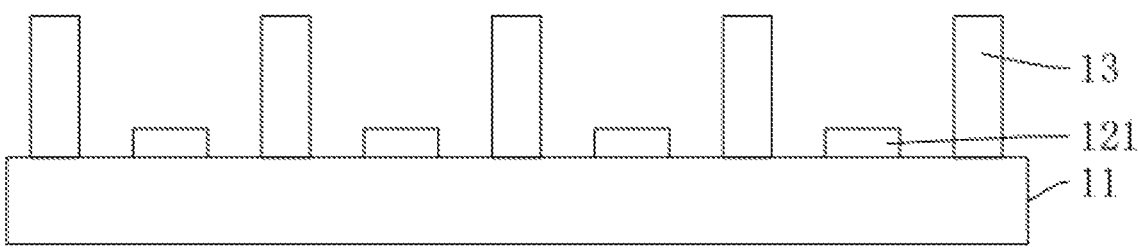
FIG. 4 is a schematic structural diagram in one manufacturing process of the display panel provided by the embodiment of the present disclosure.
Figure 5:
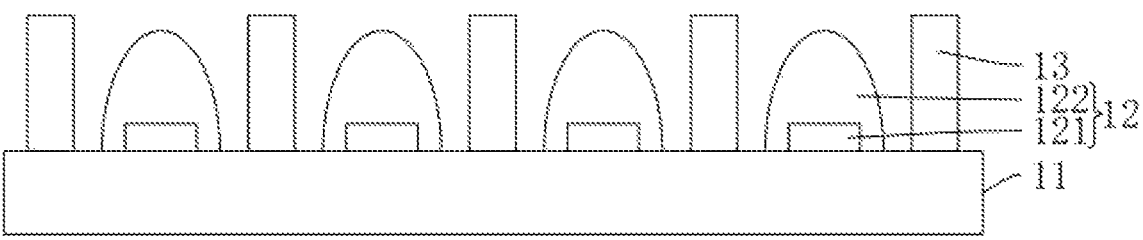
FIG. 5 is a schematic structural diagram in one manufacturing process of the display panel provided by the embodiment of the present disclosure.
Figure 6:
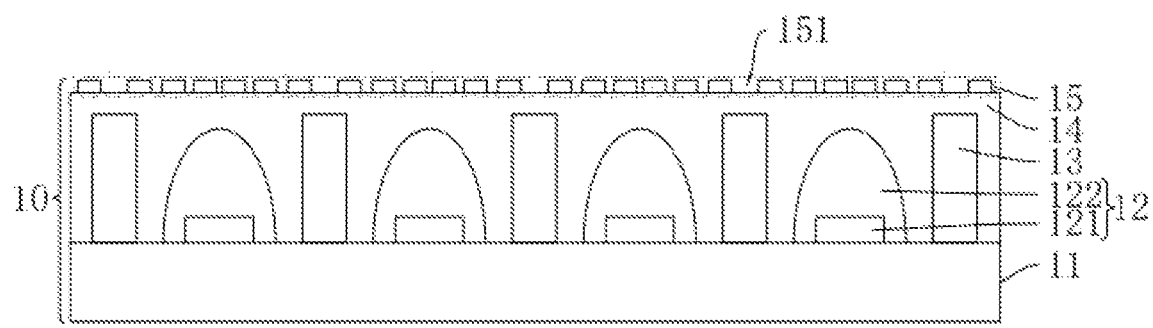
FIG. 6. is a schematic structural diagram in one manufacturing process of the display panel provided by the embodiment of the present disclosure.
Figure 7:
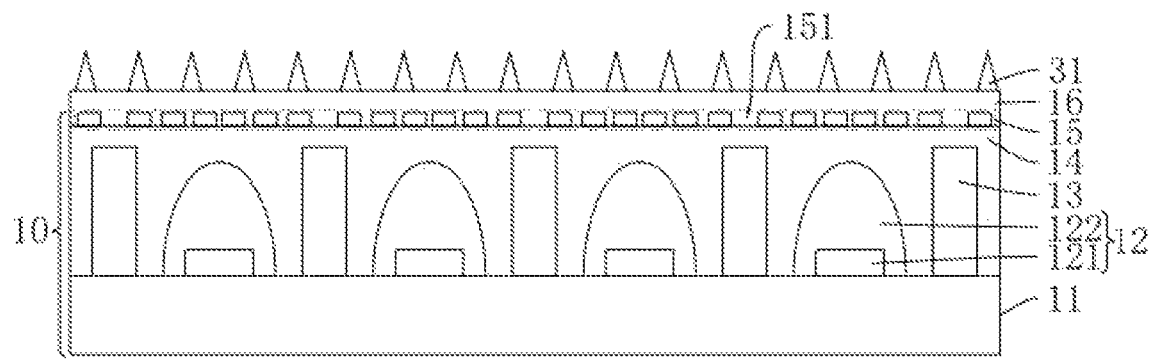
FIG. 7 is a schematic structural diagram in one manufacturing process of the display panel provided by the embodiment of the present disclosure.

In the embodiment of the present disclosure, a cross-sectional area of the convex portion 311, which along the direction parallel to the backlight assembly 10, decreases along a light emitting direction of the backlight assembly 10. That means that the convex portion 311 is a conical structure. Preferably, the convex portion 311 is a multi-faceted tapered structure, as shown in FIG. 2, therefore, each surface of the convex portion 311 may converge the light.

Optionally, the refractive index of the first adhesive layer 31 is greater than or equal to 1.45 and less than or equal to 2, and the refractive index of the second adhesive layer 32 is greater than or equal to 1 and less than or equal to 1.45. For example, the refractive index of the first adhesive layer 31 is 1.7, and the refractive index of the second adhesive layer 32 is 1.1. In addition, the materials of the first adhesive layer 31 and the second adhesive layer 32 may both include silica gel or OCA optical adhesive, etc. Specifically, the selection of materials of the first adhesive layer 31 and the second adhesive layer 32 depends on the actual refractive index requirements, which is not limited herein.

In the embodiment of the present disclosure, the material of the third adhesive layer 16 may be same as the material of the first adhesive layer 31, that is, the third adhesive layer 16 and the first adhesive layer 31 may be integrally formed.

The display panel further includes the panel body 20, and the panel body 20 is disposed on a side of the second adhesive layer 32 away from the first adhesive layer 31. That is, a side of the light converging adhesive layer 30 is attached to the backlight assembly 10, and the other side of the light converging adhesive layer 30 is attached to the panel body 20, therefore the integration of the panel body 20 and the backlight assembly 10 can be realized.

In the embodiment of the present disclosure, the panel body 20 may be a liquid crystal display (LCD) panel, and the panel body 20 may include an array substrate, a color filter substrate disposed opposite to the panel body, and a liquid crystal cell disposed between the array substrate and the color filter substrate.

The side of the panel body 20 on which the array substrate is provided is attached to the light converging adhesive layer 30, so that the backlight assembly can provide backlight for the panel body 20.

In view of above, in the embodiment of the present disclosure, the backlight assembly 10 is attached to the panel body 20 through the light converging adhesive layer 30, so as to improve the degree of the integration of the backlight assembly 10 and the panel body 2. In addition, the light converging adhesive layer 30 includes a plurality of light converging structures 301, which can converge the light emitted by the backlight assembly 10, thereby improving the light converging effect of the backlight assembly 10. In this way, the number of the optical films disposed between the backlight assembly 10 and the panel body 20 can reduce, thereby effectively reducing the thickness of the display panel and realizing the lightness and thinness of the display panel.

In addition, the present disclosure further provides a method for manufacturing a display panel described in the above-mentioned embodiment. Specifically, please refer to FIG. 1, FIG. 2, FIG. 3, FIG. 4, FIG. 5, FIG. 6, and FIG. 7.

Specifically, the method for manufacturing a display panel includes:

Providing a substrate 11, and forming a reflective layer (not shown) on the substrate 11. Optionally, the substrate 11 may be a glass substrate or an organic resin substrate, and the material of the reflective layer may include a white ink or a metal material.

Forming a plurality of openings in the reflective layer, and arranging a lamp element 121 in the opening, wherein the height of the lamp element 12 is greater than the thickness of the reflective layer.

Optionally, the lamp element 121 may include a blue light LED lamp element, specifically, a blue light Mini-LED lamp element.

Forming a plurality of retaining walls 13 on the substrate 11 by using a high reflective adhesive material, wherein the plurality of retaining walls 13 define a plurality of light emitting sub-regions 101. That is, each of the retaining walls 13 is arranged around each of the light emitting sub-regions 101. In addition, at least one lamp element 121 is disposed in each of the light emitting sub-regions 101. Because the retaining wall 13 is made of the high reflective adhesive material, a light reflecting surface is provided on a side of the retaining wall 13 adjacent to the light emitting component 12, so as to reflect the light emitted by the light emitting component 12 adjacent to the retaining wall 13. On the one hand, when each of the light emitting sub-regions 101 singly emit light, it can prevent the adjacent light emitting sub-region 101 from being affected. On the other hand, the light emitted by the light emitting component 12 can be reflected by the retaining wall 13 to adjust the light path, such that the above light propagates toward the emitting side of the backlight assembly 10.

Optionally, the material of the retaining wall 13 may include silica gel and titanium oxide.

Forming a color conversion film 122 covering each of the lamp elements 121 on the substrate 11, so as to obtain light emitting components 12.

Optionally, the material of the color conversion film 122 includes a fluorescence material or a quantum dot material.

Forming an encapsulation layer 14 on the substrate 11, wherein the encapsulation layer 14 covers the plurality of light emitting components 12 and the retaining wall 13, to protect the plurality of light emitting components 12. In addition, in the embodiment of the present disclosure, the backlight assembly 10 is defined by zoning by arranging the retaining walls 13. Therefore, the flow range of the glue of the encapsulation adhesive layer 14 is relatively less in the manufacturing process, which can effectively improve the leveling performance of the glue. In this way, the flatness of the encapsulation adhesive layer 14 can be improved, thereby improving the effect and the uniformity of the light emitted by the backlight assembly 10.

Optionally, the material of the encapsulation adhesive layer 14 may be a transparent glue material, and specifically, may include a silica gel or the like.

Forming a light mixing layer 15 on a side of the encapsulation adhesive layer 14. Specifically, forming the light mixing layer 15 on a side of the encapsulation layer 14 away from the substrate 11, and patterning the light mixing layer 15 to obtain a plurality of light transmitting openings 151 arranged at intervals and a plurality of reflective portions 152 located between the adjacent light transmitting openings 151. The reflective portions 152 can reflect the light emitted by the light emitting component 12. Furthermore, the light mixing layer 15 includes a plurality of first regions 1501 and a plurality of second regions 1502, each of the first regions 1501 is overlapped with the lamp element 121, and one of the plurality of second regions 1502 is located between the adjacent first regions 1501. In addition, the parameters of the patterning process of the light mixing layer 15 can be adjusted, such that an area proportion of the light transmitting opening 151 in the second region 1502 is greater than an area proportion of the light transmitting opening 151 in the first region 1501.

In addition, the light emitted by the lamp element 121 is converted into white light by the color conversion film 122, and the white light is emitted at a certain angle. The oblique light emitted by the lamp element 121 propagates to the retaining wall 13, and then, the oblique light is reflected to the light mixing layer 15 by the retaining wall 13. The forward light directly propagates to the light mixing layer 13. More specifically, when the white light propagates toward the light mixing layer 15, the white light propagating to the light transmitting openings 151 can directly pass through the light mixing layer 15. The white light propagating to the reflective portion 152 can be reflected to the substrate 11, and then be reflected to the light mixing layer 15 by the reflective layer. It should be understood that the light is reflected between the reflective layer and the light mixing layer 15, and the light exists from the transmitting opening 151 of the light mixing layer 15. The intensity of the forward light emitted by the lamp element 121 is greater than the intensity of the oblique light emitted by the lamp element 121, therefore, in the related art, the light emitted by the lamp panel is ununiform because the intensity of the forward light emitted by LED is greater than the intensity of the oblique light emitted by the LED. However, in the embodiment of the present disclosure, the area proportion of the light transmitting opening in the second region 1502 is greater than the area proportion of the light transmitting opening in the first region 1501, which can enhance the intensity of the light emitted through the second region 1502. That means that the embodiment of the present disclosure improves the uniformity of the light emitted through the first region 1501 and the second region 1502 by arranging the light mixing layer 15.

Specifically, a number of light transmitting openings in the second region 1502 is greater than a number of light transmitting openings in the first region 1501, and/or the area of each light transmitting opening in the second region 1502 is greater than the area of each light transmitting opening in the first region 1501. Furthermore, the area proportion of the light transmitting opening in the first region 1501 is increasing along a direction toward to the second region 1502, and the area proportion of the light transmitting opening in the second region 1502 is increasing along a direction away from the first region 1501.

Optionally, the material of the reflective portion 152 includes reflective materials, specifically, includes a combination of silica gel and titanium oxide, or a reflective metal material, which is not limited herein and can be selected according to actual needs.

Forming a third adhesive layer 16 on a side of the encapsulation adhesive layer 14 away from the substrate 11, wherein the third adhesive layer 16 covers the light mixing layer 15.

Optionally, the material of the third adhesive layer 16 includes silica gel or OCA optical adhesive.

Forming a converging adhesive layer 30 on a side of the third adhesive layer 16 away from the substrate 11. Specifically, forming a first adhesive layer 31 on a side of the third adhesive layer 16 away from the substrate 11 by using a high refractive index material, wherein the first adhesive 311 includes a plurality of convex portions 311. In addition, the plurality of the convex portions 311 may be formed in the high refractive index material by means of imprinting or the like.

Next, forming a second adhesive layer 32 on a side of first adhesive layer 31 away from the third adhesive layer 16 by using a low refractive index material, wherein the second adhesive layer 32 covers the plurality of convex portions 311. In addition, a refractive index of the second adhesive layer 32 is less than a refractive index of the first adhesive layer 31.

Furthermore, a refractive index of the first adhesive layer 131 is greater than a refractive index of the second adhesive layer 132, that is, the first adhesive layer 131 is a high refractive index adhesive layer and the second adhesive layer 132 is a low refractive index adhesive layer. In this way, a difference of refractive index is formed at the interface between the first adhesive layer 131 and the second adhesive layer 132, so as to converge the light passing through thereof.

In the embodiment of the present disclosure, a cross-sectional area of the convex portion 311, which along the direction parallel to the backlight assembly 10, decreases along a direction away from the backlight assembly 10. That means that the convex portion 311 is a conical structure. Preferably, the convex portion 311 is a multi-faceted tapered structure, as shown in FIG. 2, therefore, each surface of the convex portion 311 may converge the light.

Optionally, the refractive index of the first adhesive layer 31 is greater than or equal to 1.45 and less than or equal to 2, and the refractive index of the second adhesive layer 32 is greater than or equal to 1 and less than or equal to 1.45. For example, the refractive index of the first adhesive layer 31 is 1.7, and the refractive index of the second adhesive layer 32 is 1.1. In addition, the materials of the first adhesive layer 31 and the second adhesive layer 32 may both include silica gel or OCA optical adhesive, etc. Specifically, the selection of materials of the first adhesive layer 31 and the second adhesive layer 32 depends on the actual refractive index requirements, which is not limited herein.

In the other embodiment of the present disclosure, the material of the third adhesive layer 16 may be same as the material of the first adhesive layer 31, that is, the third adhesive layer 16 and the first adhesive layer 31 may be integrally formed. Specifically, in the process, the high refractive index material is used to form the first adhesive layer 31 (the third adhesive layer 16) on a side of the encapsulation adhesive layer 14 away from the substrate 11, and the first adhesive layer 31 covers the light mixing layer 15, and then the plurality of the convex portions 311 are formed on the side of the first adhesive layer 31 away from the light mixing layer 15 by means of imprinting or the like. Next, the low refractive index material is used form the second adhesive layer 32 on a side of the first adhesive layer 31 away from the light mixing layer 15, wherein the second adhesive layer 32 covers the plurality of convex portions 311, and is attached to the region of the first adhesive layer 31 where the convex portions 311 are not formed.

Providing a panel body 20. In the embodiment of the present disclosure, the panel body 20 may be a liquid crystal display (LCD) panel, and the panel body 20 may include an array substrate, a color filter substrate disposed opposite to the panel body, and a liquid crystal cell disposed between the array substrate and the color filter substrate.

Attaching the side of the panel body 20 on which the array substrate is provided to the light converging adhesive layer 30, so that the backlight assembly can provide backlight for the panel body 20.

In view of above, in the embodiment of the present disclosure, the backlight assembly 10 is attached to the panel body 20 through the light converging adhesive layer 30, so as to improve the degree of the integration of the backlight assembly 10 and the panel body 2. In addition, the light converging adhesive layer 30 includes a plurality of light converging structures 301, which can converge the light emitted by the backlight assembly 10, thereby improving the light converging effect of the backlight assembly 10. In this way, the number of the optical films disposed between the backlight assembly 10 and the panel body 20 can reduce, thereby effectively reducing the thickness of the display panel and realizing the lightness and thinness of the display panel.

The present disclosure further provides a display device, wherein the display device includes a display panel described in the above-mentioned embodiment, or a display panel manufactured by a method for manufacturing a display panel described in the above-mentioned embodiment.

In the above-mentioned embodiments, the description of each embodiment has its own emphasis. For parts that are not described in detail in a certain embodiment, reference may be made to the relevant descriptions of other embodiments.

In view of the above, although the present invention has been disclosed by way of preferred embodiments, the above preferred embodiments are not intended to limit the present invention, and one of ordinary skill in the art, without departing from the spirit and scope of the invention, the scope of protection of the present invention is defined by the scope of the claims,

What is claimed is:

1. A display panel, comprising:
   a backlight assembly;
   a panel body disposed on a light emitting side of the backlight assembly;
   a light converging adhesive layer, disposed between the panel body and the backlight assembly, and wherein the backlight assembly is attached to the panel body through the light converging adhesive layer; and
   wherein the light converging adhesive layer comprises a plurality of light converging structures to converge the light emitted by the backlight assembly,
   wherein the light converging adhesive layer comprises a first adhesive layer disposed on a side of the backlight assembly adjacent to the panel body, and a second adhesive layer disposed on a side of the first adhesive layer adjacent to the panel body; and
   wherein a refractive index of the first adhesive layer is greater than a refractive index of the second adhesive layer, the light converging structures comprises a plurality of convex portions disposed in the first adhesive layer, and the second adhesive layer covers the plurality of convex portions.

2. The display panel according to claim 1, wherein a cross-sectional area of each of the plurality of convex portions decreases along a light emitting direction of the backlight assembly.

3. The display panel according to claim 2, wherein each of the plurality of convex portions is a multi-faceted tapered structure.

4. The display panel according to claim 1, wherein the backlight assembly further comprises a third adhesive layer attached to the light converging adhesive layer, the material of the third adhesive layer is same as the material of the plurality of convex portions, and the plurality of convex portions is disposed on a side of the third adhesive layer adjacent to the second adhesive layer.

5. The display panel according to claim 1, wherein the refractive index of the first adhesive layer is greater than or equal to 1.45 and less than or equal to 2, and the refractive index of the second adhesive layer is greater than or equal to 1 and less than or equal to 1.45.

6. The display panel according to claim 1, wherein the backlight assembly comprises a substrate, a plurality of light emitting components disposed on the substrate, and a reflective layer disposed on the substrate and between the adjacent light emitting components, wherein each of the light emitting components comprises a lamp element disposed on the substrate, and a color conversion film covering the lamp element.

7. The display panel according to claim 6, wherein the backlight assembly comprises a plurality of light emitting sub-regions, each of the light emitting sub-regions is provided with at least one of the light emitting components, and the backlight assembly further comprises a retaining wall disposed on the substrate and arranged around each of the light emitting sub-regions, and a light reflecting surface disposed on a side of the retaining wall adjacent to the light emitting components.

8. The display panel according to claim 7, wherein the backlight assembly further comprises an encapsulation adhesive layer disposed on the substrate, and a light mixing layer disposed on a side of the encapsulation adhesive layer away from the substrate, the encapsulation adhesive layer covers the plurality of light emitting components and the retaining wall, the light mixing layer comprises a plurality of light transmitting openings arranged at intervals, and the material of the light mixing layer comprises a reflective material.

9. The display panel according to claim 8, wherein the light mixing layer comprises a plurality of first regions and a plurality of second regions, each of the first regions is overlapped with the lamp element, and one of the plurality of second regions is located between the adjacent two first regions, wherein an area proportion of the light transmitting opening in the second region is greater than an area proportion of the light transmitting opening in the first region.

10. The display panel according to claim 9, wherein the sum of the areas of the light transmitting openings in the plurality of second regions is greater than the sum of the areas of the light transmitting openings in the plurality of first regions.

11. The display panel according to claim 10, wherein the area of each light transmitting opening in the second region is greater than the area of each light transmitting opening in the first region, and/or a number of light transmitting openings in the second region is greater than a number of light transmitting openings in the first region.

12. A display device including a display panel, the display panel comprising:
   a backlight assembly;
   a panel body disposed on a light emitting side of the backlight assembly;
   a light converging adhesive layer, disposed between the panel body and the backlight assembly, and wherein the backlight assembly is attached to the panel body through the light converging adhesive layer; and
   wherein the light converging adhesive layer comprises a plurality of light converging structures to converge the light emitted by the backlight assembly,
   wherein the light converging adhesive layer comprises a first adhesive layer disposed on a side of the backlight assembly adjacent to the panel body, and a second adhesive layer disposed on a side of the first adhesive layer adjacent to the panel body; and wherein a refractive index of the first adhesive layer is greater than a refractive index of the second adhesive layer, the light converging structures comprises a plurality of convex portions disposed in the first adhesive layer, and the second adhesive layer covers the plurality of convex portions.

13. The display device according to claim 12, wherein a cross-sectional area of each of the plurality of convex portions decreases along a light emitting direction of the backlight assembly.

14. The display device according to claim 13, wherein each of the plurality of convex portions is a multi-faceted tapered structure.

15. The display device according to claim 12, wherein the backlight assembly comprises a substrate, a plurality of light emitting components disposed on the substrate, and a reflective layer disposed on the substrate and between the adjacent light emitting components, wherein each of the light emitting components comprises a lamp element disposed on the substrate, and a color conversion film covering the lamp element.

16. The display device according to claim 15, wherein the backlight assembly comprises a plurality of light emitting sub-regions, each of the light emitting sub-regions is provided with at least one of the light emitting components, and the backlight assembly further comprises a retaining wall disposed on the substrate and arranged around each of the light emitting sub-regions, and a light reflecting surface disposed on a side of the retaining wall adjacent to the light emitting components.

17. The display device according to claim 16, wherein the backlight assembly further comprises an encapsulation adhesive layer disposed on the substrate, and a light mixing layer disposed on a side of the encapsulation adhesive layer away from the substrate, the encapsulation adhesive layer covers the plurality of light emitting components and the retaining wall, the light mixing layer comprises a plurality of light transmitting openings arranged at intervals, and the material of the light mixing layer comprises a reflective material.

18. The display device according to claim 17, wherein the light mixing layer comprises a plurality of first regions and a plurality of second regions, each of the first regions is overlapped with the lamp element, and one of the plurality of second regions is located between the adjacent two first regions, wherein an area proportion of the light transmitting opening in the second region is greater than an area proportion of the light transmitting opening in the first region.

19. A display panel, comprising:
a backlight assembly;
a panel body disposed on a light emitting side of the backlight assembly;
a light converging adhesive layer, disposed between the panel body and the backlight assembly, and wherein the backlight assembly is attached to the panel body through the light converging adhesive layer; and
wherein the light converging adhesive layer comprises a plurality of light converging structures to converge the light emitted by the backlight assembly, and
wherein the backlight assembly comprises a substrate, a plurality of light emitting components disposed on the substrate, and a reflective layer disposed on the substrate and between the adjacent light emitting components, wherein each of the light emitting components comprises a lamp element disposed on the substrate, and a color conversion film covering the lamp element.

* * * * *